(12) United States Patent
Kumar et al.

(10) Patent No.: US 9,710,315 B2
(45) Date of Patent: Jul. 18, 2017

(54) NOTIFICATION OF BLOCKING TASKS

(71) Applicant: QUALCOMM Incorporated, San Diego, CA (US)

(72) Inventors: Tushar Kumar, San Diego, CA (US); Pablo Montesinos Ortego, Fremont, CA (US); Arun Raman, Santa Clara, CA (US)

(*) Notice: Subject to any disclaimer, the term of this patent is extended or adjusted under 35 U.S.C. 154(b) by 132 days.

(21) Appl. No.: 14/599,609

(22) Filed: Jan. 19, 2015

(65) Prior Publication Data

US 2016/0078246 A1  Mar. 17, 2016

Related U.S. Application Data

(60) Provisional application No. 62/049,999, filed on Sep. 12, 2014.

(51) Int. Cl.
G06F 9/54 (2006.01)
G06F 9/46 (2006.01)
G06F 9/30 (2006.01)
G06F 21/62 (2013.01)

(52) U.S. Cl.
CPC ............ G06F 9/542 (2013.01); G06F 9/3009 (2013.01); G06F 9/461 (2013.01); G06F 21/629 (2013.01); *G06F 2221/2147* (2013.01)

(58) Field of Classification Search
CPC .......... G06F 9/541; G06F 9/542; G06F 9/461; G06F 21/629; G06F 9/3009
See application file for complete search history.

(56) References Cited

U.S. PATENT DOCUMENTS

| 5,519,867 | A  | * | 5/1996  | Moeller ................ G06F 9/4428 710/200 |
| 6,968,557 | B1 | * | 11/2005 | Zhang .................. G06F 9/4425 711/119 |
| 7,536,690 | B2 |   | 5/2009  | Alverson et al. |
| 8,074,116 | B2 |   | 12/2011 | Pardoe et al. |
| 8,365,198 | B2 |   | 1/2013  | Duffy |
| 8,756,604 | B2 | * | 6/2014  | Paperin ................... G06F 9/541 718/100 |
| 2004/0078618 | A1 | * | 4/2004 | Moser ..................... G06F 9/526 714/3 |
| 2009/0293073 | A1 | * | 11/2009 | Nathan .................. G06F 9/547 719/328 |
| 2013/0081054 | A1 | * | 3/2013 | Holembowski ........ G05B 19/05 718/107 |
| 2013/0298133 | A1 |   | 11/2013 | Jones et al. |

* cited by examiner

Primary Examiner — Robert Leung

(57) ABSTRACT

A computing device may be configured to generate and execute a task that includes one or more blocking constructs that each encapsulate a blocking activity and a notification handler corresponding to each blocking activity. The computing device may launch the task, execute one or more of the blocking constructs, register the corresponding notification handler for the blocking activity that will be executed next with the runtime system, perform the blocking activity encapsulated by the blocking construct to request information from an external resource, cause the task to enter a blocked state while it waits for a response from the external resource, receive an unblocking notification from an external entity, and invoke the registered notification handler to cause the task to exit the blocked state and/or perform clean up operations to exit/terminate the task gracefully.

15 Claims, 8 Drawing Sheets

NOTIFICATION OF BLOCKING TASKS

RELATED APPLICATIONS

This application claims the benefit of priority to U.S. Provisional Application No. 62/049,999, entitled "Method And System for Precise and Efficient Notification of Blocking Tasks," filed Sep. 12, 2014, the entire contents of which are hereby incorporated by reference.

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, watches, headphones, remote controls, etc.) have become more complex than ever, and now commonly include multiple processors, system-on-chips (SoCs), and other resources that allow mobile device users to execute complex and power intensive application programs (e.g., video streaming, video processing, etc.) on their mobile devices.

Due to these and other improvements, smartphones and tablet computers have grown in popularity, and are replacing laptops and desktop machines as the platform of choice for many users. As mobile devices continue to grow in popularity, improved processing solutions that better utilize the multiprocessing capabilities of the mobile devices will be desirable to consumers.

SUMMARY

The various aspects include methods of executing a blocking task in a computing device. In an aspect, a method of executing a blocking task in a computing device may include executing a blocking construct that encapsulates a blocking activity and a notification handler, the blocking construct defined within the body of the blocking task. In an aspect, the method may include receiving an unblocking notification from an external entity, determining whether the blocking task is in a blocked state, and invoking the notification handler in response to determining that the blocking task is in the blocked state. In a further aspect, receiving the unblocking notification from the external entity may include receiving a cancellation notification from the external entity.

In a further aspect, the method may include executing the blocking construct, and registering the notification handler with a runtime system of the computing device. In a further aspect, registering the notification handler with the runtime system may include storing information included in the body of the notification handler in an internal data structure. In a further aspect, the method may include performing the blocking activity encapsulated by the blocking construct, causing the blocking task to enter a blocked state, receiving an unblocking notification from an external entity, and invoking the registered notification handler in response to receiving the unblocking notification from the external entity.

In a further aspect, the blocking task may include a plurality of blocking constructs that each encapsulates a blocking activity and a notification handler. In a further aspect, invoking the registered notification handler in response to receiving the unblocking notification from the external entity for the blocking task includes identifying the blocking activity that was performed, and invoking only the notification handler that corresponds to the identified blocking activity.

Further aspects may include a computing device that includes a processor configured with processor-executable instructions to perform operations that may include executing a blocking construct that encapsulates a blocking activity and a notification handler, the blocking construct defined within the body of the blocking task. In an aspect, the processor may be configured with processor-executable instructions to perform operations that further include receiving an unblocking notification from an external entity, determining whether the blocking task is in a blocked state, and invoking the notification handler in response to determining that the blocking task is in the blocked state. In a further aspect, the processor may be configured with processor-executable instructions to perform operations such that receiving the unblocking notification from the external entity includes receiving a cancellation notification from the external entity.

In a further aspect, the processor may be configured with processor-executable instructions to perform operations that further include executing the blocking construct, and registering the notification handler with a runtime system of the computing device. In a further aspect, the processor may be configured with processor-executable instructions to perform operations such that registering the notification handler with the runtime system includes storing information included in the body of the notification handler in an internal data structure. In a further aspect, the processor may be configured with processor-executable instructions to perform operations that further include performing the blocking activity encapsulated by the blocking construct, causing the blocking task to enter a blocked state, receiving an unblocking notification from an external entity, and invoking the registered notification handler in response to receiving the unblocking notification from the external entity.

Further aspects may include a non-transitory processor-readable storage medium having stored thereon processor-executable instructions configured cause a processor in a computing device to perform operations for executing a blocking task that may include executing a blocking construct that encapsulates a blocking activity and a notification handler, the blocking construct defined within the body of the blocking task. In an aspect, the stored processor-executable instructions may be configured to cause a processor to perform operations that further include receiving an unblocking notification from an external entity, determining whether the blocking task is in a blocked state, and invoking the notification handler in response to determining that the blocking task is in the blocked state. In a further aspect, the stored processor-executable instructions may be configured to cause a processor to perform operations such that receiving the unblocking notification from the external entity includes receiving a cancellation notification from the external entity.

In a further aspect, the stored processor-executable instructions may be configured to cause a processor to perform operations that further include executing the blocking construct, and registering the notification handler with a runtime system of the computing device. In a further aspect, the stored processor-executable instructions may be configured to cause a processor to perform operations such that registering the notification handler with the runtime system includes storing information included in the body of the notification handler in an internal data structure. In a further aspect, the stored processor-executable instructions may be configured to cause a processor to perform operations that further include performing the blocking activity encapsulated by the blocking construct, causing the blocking task to enter a blocked state, receiving an unblocking notification from an external entity, and invoking the registered notification handler in response to receiving the unblocking notification from the external entity.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
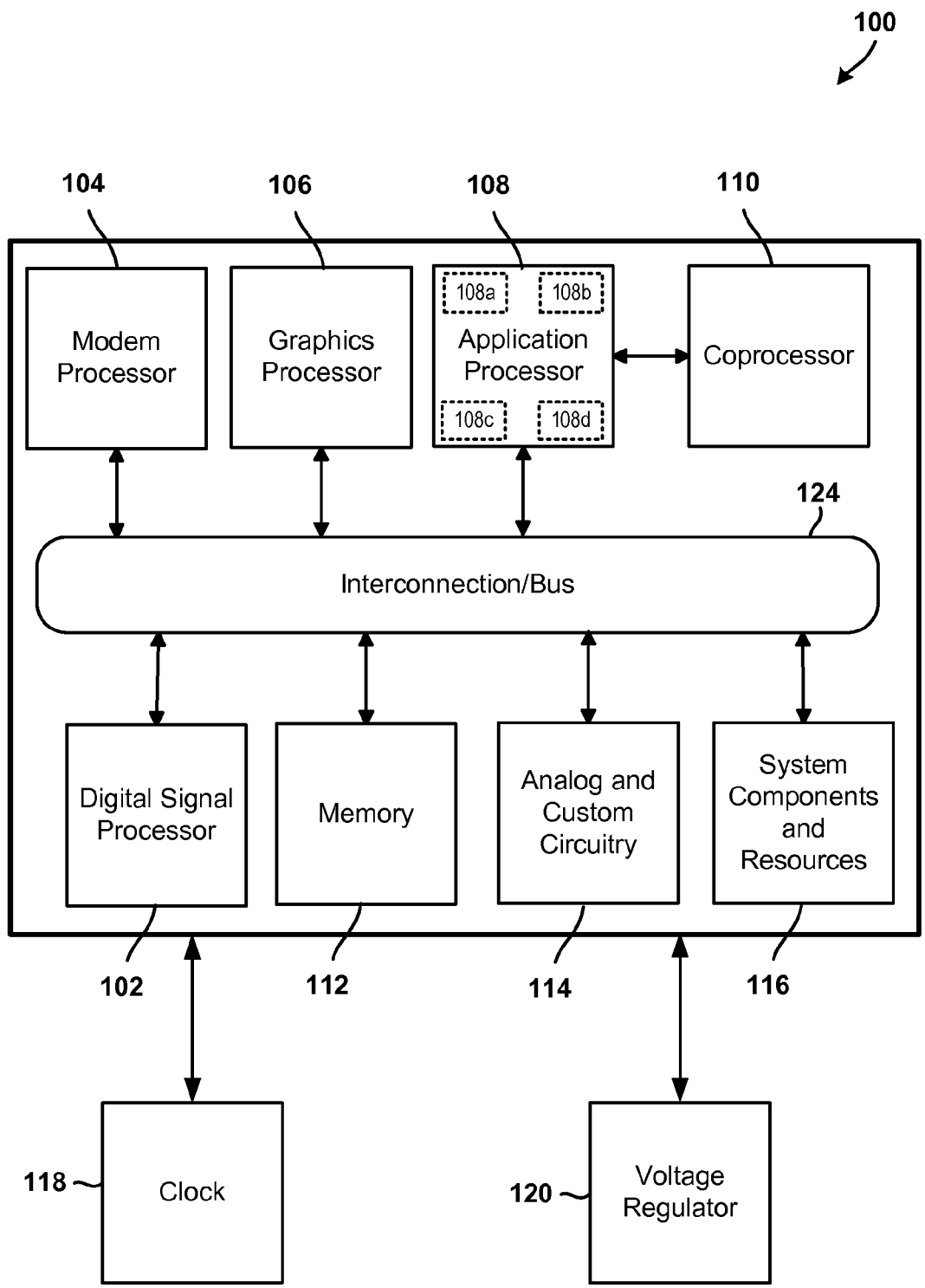
FIG. 1 is an architectural diagram of an example system on chip suitable for implementing the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

For ease of reference, the various embodiments are described below with reference to "tasks" and the "task-parallel programming model." However, it should be understood that any operation described with reference to a "task" may also be performed by a thread or any other structure, construct, or representation in any concurrent programming system that includes blocking. As such, nothing in this application should be used to limit claims to tasks, threads, task-parallel programming, or any other system or technology, unless expressly recited as such in the claims.

In overview, the various embodiments may include methods, and computing devices configured to perform the methods, that exploit the concurrency and parallelism enabled by modern multiprocessor architectures to generate and execute application programs in order to achieve fast response times, high performance, and high user interface responsiveness. In the various embodiments, a computing device (e.g., a mobile computing device, etc.) may be configured to generate and execute a task that includes a blocking construct that encapsulates a blocking activity (e.g., a system call that manages an external resource, etc.) and a notification handler. The computing device may be configured to receive an unblocking notification (e.g., a cancellation notification, etc.) from an external entity, determine whether the task is currently in a blocked state, and invoke the notification handler only when the task is determined to be in a blocked state. In addition, the computing device may execute the blocking construct, register the notification handler with the runtime system (e.g., by storing information included in the body of the notification handler in an internal data structure), perform the blocking activity encapsulated by the blocking construct to request information from an external resource, cause the task to enter a blocked state while it waits for a response to the request for information issued by the blocking activity, receive an unblocking notification from an external entity while the task is in the blocked state, and invoke the registered notification handler to cause the task to exit the blocked state and/or perform clean up operations to exit/terminate the task gracefully. In an embodiment, the unblocking notification may be a cancellation notification.

By changing the nature of how notification handlers are defined and used by the computing device when cancelling and/or unblocking a blocked task, the various embodiments may allow the computing device to terminate a blocked task gracefully without performing spurious or complex operations. This improves the functioning of the computing device by reducing the latencies associated with executing tasks and application programs on the device. The various embodiments may also improve the functioning of the computing device by improving its efficiency, performance, and power consumption characteristics.

The terms "computing system" and "computing device" are used generically herein to refer to any one or all of servers, personal computers, and mobile computing devices, such as cellular telephones, smartphones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor. While the various embodiments are particularly useful in mobile computing devices, such as smartphones, which have limited processing power and battery life, the embodiments are generally useful in any computing device that includes a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips or substrates. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile computing device. The proximity of the SOCs facilitates high speed communications and the sharing of memory and resources.

The term "multicore processor" is used herein to refer to a single integrated circuit (IC) chip or chip package that contains two or more independent processing cores (e.g., CPU core, IP core, GPU core, etc.) configured to read and execute program instructions. A SOC may include multiple multicore processors, and each processor in an SOC may be referred to as a core. The term "multiprocessor" is used herein to refer to a system or device that includes two or more processing units configured to read and execute program instructions.

The term "handler" is used herein to refer to a procedure or sequence of operations that may be executed in a processor core of a computing device and invoked by a runtime system. The term "handle" is used herein to refer to a component or structure (e.g., data structure, information structure, etc.) used to access a resource of the computing system, such as a network port, file on disk, user I/O connection, etc.

The term "runtime system" is used herein to refer to a combination of software and/or hardware resources in a computing device that support the execution of an application program in that device. For example, a runtime system may include all or portions of the computing device's processing resources, operating systems, library modules, schedulers, processes, threads, stacks, counters, and/or other similar components. A runtime system may be responsible for allocating computational resources to an application program, for controlling the allocated resources, and for performing the operations of the application program.

A parallel programming runtime system is a runtime system that supports concurrent/parallel execution of all or portions of one or more application programs. Modern parallel programming runtime systems allow software designers to create high-performance parallel application programs that better exploit the concurrency and/or parallelism capabilities of modern processor architectures. A software designer may specify the portions of an application program that are to be executed (such as a programmer-specified C/C++ function) by the parallel programming runtime system. The runtime system may execute or perform the portions in one or more hardware processing units (e.g., processor, a processing core, etc.) via processes, threads, or tasks.

A process may be a software representation of an application program in a computing device. Processes may be executed on a processor in short time slices so that it appears that multiple application programs are running simultaneously on the same processor (e.g., by using time-division multiplexing techniques), such as a single-core processor. When a process is removed from a processor at the end of a time slice, information pertaining to the current operating state of the process (i.e., the process's operational state data) is stored in memory so the process may seamlessly resume its operations when it returns to execution on the processor.

A process's operational state data may include the process's address space, stack space, virtual address space, register set image (e.g. program counter, stack pointer, instruction register, program status word, etc.), accounting information, permissions, access restrictions, and state information. The state information may identify whether the process is in a running state, a ready or ready-to-run state, or a blocked state. A process is in the ready-to-run state when all of its dependencies or prerequisites for execution have been met (e.g., memory and resources are available, etc.), and is waiting to be assigned to the next available processing unit. A process is in the running state when its procedure is being executed by a processing unit. A process is in the blocked state when it is waiting for the occurrence of an event (e.g., input/output completion event, etc.).

A process may spawn other processes, and the spawned process (i.e., a child process) may inherit some of the permissions and access restrictions (i.e., context) of the spawning process (i.e., the parent process). A process may also be a heavy-weight process that includes multiple light-weight processes or threads, which are processes that share all or portions of their context (e.g., address space, stack, permissions and/or access restrictions, etc.) with other processes/threads. Thus, a single process may include multiple threads that share, have access to, and/or operate within a single context (e.g., a processor, process, or application program's context).

A multiprocessor system may be configured to execute multiple threads concurrently or in parallel to improve a process's overall execution time. In addition, an application program, operating system, runtime system, scheduler, or another component in the computing system may be configured to create, destroy, maintain, manage, schedule, or execute threads based on a variety of factors or considerations. For example, to improve parallelism, the system may be configured to create a thread for every sequence of operations that could be performed concurrently with another sequence of operations.

Application programs that maintain a large number of idle threads, or frequently destroy and create new threads, often have a significant negative or user-perceivable impact on the responsiveness, performance, or power consumption characteristics of the computing device. Therefore, an application program may implement or use a task-parallel programming model or solution that provides adequate levels of parallelism without requiring the creation or maintenance of a large number of threads. Such solutions allow the computing system to split the computation of an application program into tasks, assign the tasks to the thread pool that maintains a near-constant number of threads (e.g., one for each processing unit), and execute assigned tasks via the threads of the thread pool. A process scheduler or runtime system of the computing system may schedule tasks for execution on the processing units, similar to how processes and threads may be scheduled for execution.

A task may include any procedure, unit of work, or sequence of operations that may be executed in a processing unit via a thread. A task may include state information that identifies whether the task is launched, ready, blocked, or finished. A task is in the launched state when it has been assigned to a thread pool and is waiting for a predecessor task to finish execution and/or for other dependencies or prerequisites for execution to be met. A task is in the ready state when all of its dependencies or prerequisites for execution have been met (e.g., all of its predecessors have finished execution), and is waiting to be assigned to the next available thread. A task is in the blocked state when it (or its associated thread) is waiting on a dependency to be resolved, a resource to become available, a system call to return, a response to system request, etc. A task may be marked as finished after its procedure has been executed by a thread or after being canceled.

A parallel programming runtime system may execute or perform a portion of an application program by launching or executing a task. During execution, the task may invoke system calls to request information from an entity that is external to, or outside the scope of, the application program or the runtime system. Such system calls often require that the task enter a blocked state (or for its thread to enter the blocked state) while the task waits for a response. Any system call that could cause the task to enter the blocked state may be referred to herein as a "blocking activity" or a "blocking call," and any task that includes a blocking activity may be referred to as a "blocking task."

A blocked task typically does not exit the blocked state until a processor core receives a suitable response, which may include detecting that a component of the computing device has written information to a designated resource (e.g., a network resource identified by a network handle, a resource identified by a user I/O handle, etc.). For example, a task executing on a processor core may issue a blocking call to a network resource (i.e., a network call), enter the blocked state, and cause a processor core or the runtime system to wait for a suitable response. The processor core executing the task or the runtime system may then monitor a network handle associated with the network call to determine whether a suitable response to the network call has been received. The processor core executing the task or the runtime system may determine that a suitable response to the network call has been received in response to detecting that information has been written to that network handle. The task may then be woken-up, released, or unblocked to read the information written to the network handle.

A parallel programming runtime system may execute multiple tasks concurrently and/or in parallel, and a first task may issue a request to cancel or unblock a concurrent computation, procedure, or operation of a second task. In certain scenarios, such a cancellation or unblock request may cause problems on the computing device. For example, a cancellation request may cause the second task to abruptly end all or portions of its current operations, which if the second task is in a blocked state, may corrupt a portion of the device memory and/or cause other problems in the computing device. Therefore, conventional solutions require that a blocking task be associated with a notification handler so as to ensure proper operation when a cancellation or unblock request is received from another task.

A notification handler (e.g., an unblocking handler, a cancellation handler, etc.) may be any procedure or sequence of operations that may be executed in a processing unit, and invoked by the runtime system to unblock a task or perform cleanup operations (e.g., in response to a cancellation request, an unblock request, etc.). Conventional solutions require that the notification handler be defined at the task or thread level, and for the software designer to determine the operations that must be performed by the notification handler to unblock a task. As an example, when launching a blocking task that includes a network blocking call (i.e., a system call to manage an external network resource that could cause the task to enter a blocked state), a conventional solution may require that the software designer create and identify a notification handler that spuriously writes dummy data on a network connection/handler (or performs other similar operations) to unblock the task. The notification handler may also be required to identify the reason that the task was unblocked (e.g., due to a cancellation request, an unblock request, successful completion of the system call, etc.) so that the task may determine whether it should continue its execution or perform cleanup operations (to exit/terminate gracefully).

Thus, conventional solutions require blocking tasks to be associated with task-level or thread level notification handlers, and these handlers may be used to safely cancel and/or unblock blocked tasks. Yet, conventional solutions do not intelligently determine the type of blocking call made by a blocked task, or whether the notification handler should be invoked. Conventional solutions also do not compute, determine, or identify important contextual data about the blocked task that may be used to quickly and efficiently unblock the task. Due to these limitations, conventional solutions often require that the computing device perform spurious or complex operations. Such operations are an inefficient use of the computing device's resources, and may have a significant negative impact on the performance, responsiveness, or power consumption characteristics of the computing device. For these and other reasons, conventional solutions may not be suitable for use in many modern computing devices, such as smartphones, which operate on battery power, have limited resources, and for which performance is important.

By changing the nature of how notification handlers are defined and used, and by allowing for the more focused and more precise use of the notification handlers, the various embodiments may eliminate or reduce the number of spurious and/or complex operations performed by the computing device when unblocking/cancelling blocked tasks. As a result, the various embodiments may eliminate or reduce the negative impact of such operations on the performance, responsiveness, and power consumption characteristics of the computing device. Therefore, the various embodiments may be well suited for inclusion and use in mobile and resource-constrained computing devices, such as smartphones, which operate on battery power, have limited resources, and for which performance is important.

In an embodiment, a computing device may be configured to define a blocking construct that associates a specific blocking activity (e.g., a blocking call, etc.) with a specific notification handler. The use of the blocking construct allows the notification handler to be defined within the body of a task and/or at the application program level (as opposed to the task or thread level). This allows the computing device to intelligently determine whether the notification handler should be invoked, and reduces the complexity associated with designing an efficient notification handler.

As mentioned above, in an embodiment, the computing device may be configured to intelligently determine whether the notification handler should be invoked. This is particularly important in scenarios in which a first task includes a blocking call, and a second task includes a critical procedure that requires assurance that the first task is not in the blocked state. In such cases, conventional solutions require that the second task invoke the notification handler of the first task before the second task executes its critical procedure, regardless of whether the first task is currently in the blocked state. Yet, executing the notification handler when the first task is not blocked is an inefficient use of the computing device's often-limited resources. Further, since such operations may corrupt data that is stored in a memory of the computing device or otherwise cause negative or unintended consequences, conventional solutions require that the software designers define/design the notification handlers to account for conditions in which their associated tasks are not in a blocked state. Such requirements make designing efficient notification handlers much more challenging, and make implementing and enforcing blocking dependencies more difficult.

By defining blocking constructs that associate a specific blocking activity with a specific notification handler, and including such constructs in the body of the tasks, the various embodiments allow the computing device to intelligently determine whether the notification handler should be invoked. This is because the blocking constructs allow the computing device to execute the specific notification handler associated with the specific blocking activity (e.g., blocking call) for each task that is blocked. Said another way, the blocking constructs allow the computing device to forgo executing a notification handler unless it is associated with a specific blocking activity (e.g., a particular blocking call) for which a task is blocked. This improves the efficiency, performance, and power consumption characteristics of the computing device.

Generally, a task may include multiple different types of blocking calls. For example, a task may include a network blocking call and a user-input blocking call. Each type of blocking call may require that the computing device perform a different set of operations to unblock the task. For example, the network blocking call may require that information be written to a network handler before the task is unblocked, and the user-input blocking call may require that information be written to an I/O handler before the task is unblocked.

Conventional solutions require that each task collect and store extra bookkeeping information that may be used to identify the operations that are required to unblock the task. Conventional solutions also require that the cancellation handler be executed in a parallel thread so that it may locate, read and analyze the bookkeeping information collected by the task. However, such operations are an inefficient use of the computing device's memory, processing, and power resources.

The various embodiments may overcome these limitations of conventional solutions by configuring the computing device to intelligently determine the types of blocking calls made by a blocked task. The computing device may use this information to quickly and efficiently identify the operations required to unblock the task. The computing device may accomplish this without requiring that the task collect and store extra bookkeeping information or requiring that the notification handler locate, read, and analyze the extra bookkeeping information collected by the task. In an embodiment, the computing device may also accomplish this without requiring that a cancellation handler be executed in a parallel thread. As a result, the various embodiments may eliminate or reduce the negative impact of such operations on the performance, responsiveness, and power consumption characteristics of the computing device. This further improves the functioning of the computing device.

Generally, task-level notification handlers and thread-level notification handlers must be defined prior to the task's execution. Yet, the specific handler that is associated with a specific blocking call is often determined during the tasks execution. This means that conventional notification handlers must be designed, defined, and/or generated without access to important contextual data, such as information identifying the specific network handle associated with specific blocking calls. This also means that the software designer may be required to design the tasks and notification handlers at the same time and/or so that they share data a-priori. Such requirements make designing efficient application programs that fully utilize the multiprocessing capabilities of the computing device more challenging.

In addition, for scenarios in which the runtime system invokes multiple instances of a task or procedure (e.g., via data-parallel execution of the procedure over an iteration space, such as by a "parallel-for" construct of the runtime system), conventional solutions require that the notification handler be invoked with iteration-specific data, from which the handler would have to deduce data for identifying the blocking activity. Such requirements further increase the difficulty of designing efficient application programs that fully utilize the multiprocessing capabilities of the computing device.

The various embodiments may overcome these and other limitations of conventional solutions by providing blocking constructs that allow a task to define a specific handler for each specific blocking activity, without the task and handler sharing data in advance of run time. This allows the software designers to design tasks and their handlers independently and/or to perform a wider range of operations.

FIG. 1 illustrates an example system-on-chip (SOC) 100 architecture that may be included in an embodiment computing device configured to execute application programs that implement the task-parallel programming model and/or to execute tasks in accordance with the various embodiments. The SOC 100 may include a number of heterogeneous processors, such as a digital signal processor (DSP) 102, a modem processor 104, a graphics processor 106, and an application processor 108. The SOC 100 may also include one or more coprocessors 110 (e.g., vector co-processor) connected to one or more of the processors 102, 104, 106, 108. In an embodiment, the graphics processor 106 may be a graphics processing unit (GPU).

Each processor 102, 104, 106, 108, 110 may include one or more cores (e.g., processing cores 108*a*, 108*b*, 108*c*, and 108*d* illustrated in the application processor 108), and each processor/core may perform operations independent of the other processors/cores. SOC 100 may include a processor that executes an operating system (e.g., FreeBSD, LINUX, OS X, Microsoft Windows 8, etc.) which may include a scheduler configured to schedule sequences of instructions, such as threads, processes, or data flows, to one or more processing cores for execution.

The SOC 100 may also include analog circuitry and custom circuitry 114 for managing sensor data, analog-to-digital conversions, wireless data transmissions, and for performing other specialized operations, such as processing encoded audio and video signals for rendering in a web browser. The SOC 100 may further include system components and resources 116, such as voltage regulators, oscillators, phase-locked loops, peripheral bridges, data controllers, memory controllers, system controllers, access ports, timers, and other similar components used to support the processors and software programs running on a computing device.

The system components and resources 116 and/or analog circuitry and custom circuitry 114 may include circuitry to interface with peripheral devices, such as cameras, electronic displays, wireless communication devices, external memory chips, etc. The processors 102, 104, 106, 108 may communicate with each other, as well as with one or more memory elements 112, system components and resources 116, and analog circuitry and custom circuitry 114, via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., a DSP 102, a modem processor 104, a graphics processor 106, an application processor 108, etc.).

The various embodiments (including, but not limited to, embodiments discussed below with respect to FIGS. 3, 4A and 4B) may be implemented in the SOC 100 discussed above and also a wide variety of computing systems, which may include a single processor, single-core processor, multiple processors, a multicore processor, or any combination thereof.

Figure 2:
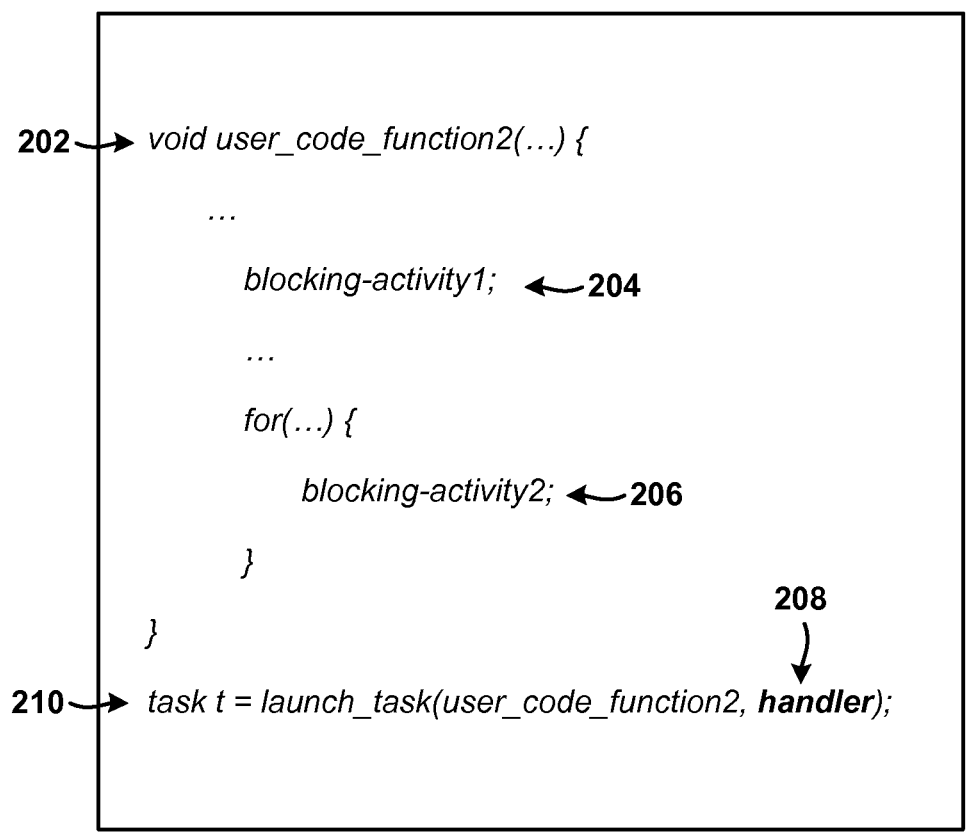
FIG. 2 is an illustration of an example prior art solution for defining blocking activities in a task.

FIG. 2 illustrates an example prior art solution for defining a blocking task (i.e., a task that includes a blocking activity). The example illustrated in FIG. 2 includes a function 202 that includes multiple blocking activities 204, 206, but not a notification handler 208. Rather, the notification handler 208 is defined at the task-level in a task declaration 210. This means that the notification handler 208 must be defined prior to launching task t, and that after the task is launched, the runtime system will not be able to intelligently determine which (if any) of blocking activities 204, 206 have caused the task to block, or to intelligently determine whether the notification handler 208 should be invoked.

Figure 3:
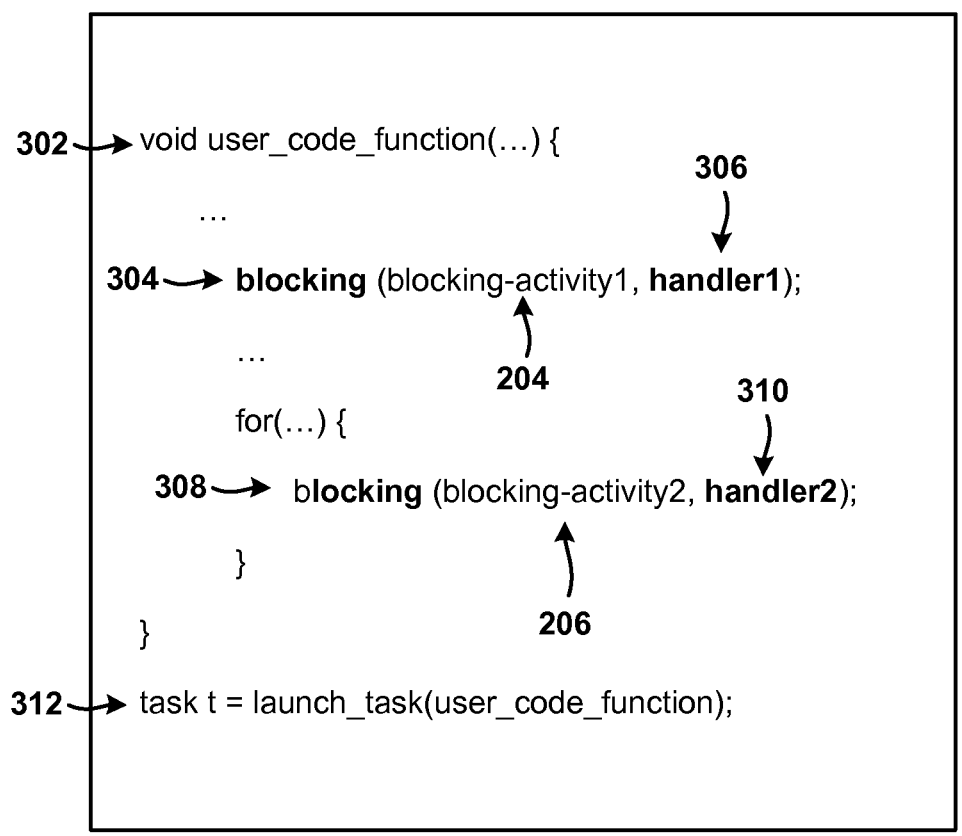
FIG. 3 is an illustration of an example embodiment solution for defining blocking activities in a task.

FIG. 3 illustrates an embodiment solution for defining a blocking task, which may be executed or performed in variety of computing devices and system architectures, such as the examples illustrated in FIGS. 1 and 5-7.

FIG. 3 illustrates a function 302 and a task declaration 312. The function 302 includes blocking constructs 304 and 308. Each of the blocking constructs 304 and 308 encapsulate a blocking activity 204, 206 and a notification handler 306, 310. In the illustration, notification hander 306 is specific to blocking activity 204, and notification hander 310 is specific to blocking activity 206.

Thus, contrary to the example illustrated in FIG. 2, the task declaration does not include a notification handler. Rather, the notification handlers 306, 310 are included within the body of function 302 at the specific program points at which their corresponding blocking activities 204, 206 occur. As a result, the notification handlers 306, 310 are not tied to a task or thread, and may be defined after task t has been launched.

Each of the blocking constructs 304, 308 may be implemented to return a status value that identifies the reason the task was unblocked (i.e., received a valid response, received a cancellation request, etc.). The blocking constructs 304, 308 may also be implemented to throw an exception that identifies the reason the task was unblocked. Both styles of implementation allow the application program to perform additional clean-up processing operations (if cancelled or unblocked for other reasons), and then terminate (if cancelled).

Figure 4A:
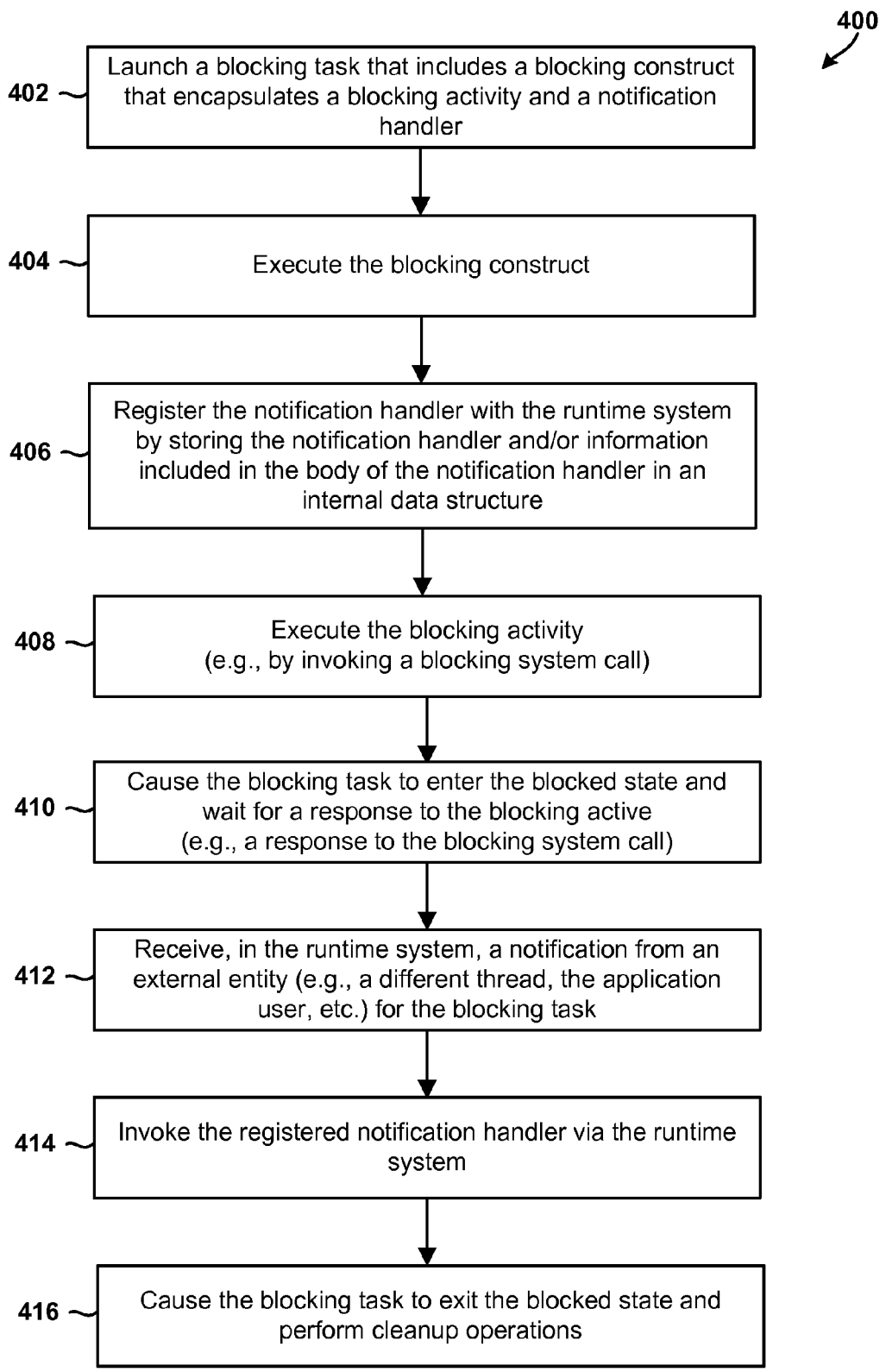
FIG. 4A is a process flow diagram illustrating a method of executing tasks in accordance with an embodiment.

FIG. 4A illustrates a method 400 of unblocking a blocked task in accordance with an embodiment. Method 400 may be performed by one or more processors or processing cores in a computing device, system-on-chip, system-in-a-package, etc. In block 402, the processing core may launch a blocking task that includes a blocking construct that encapsulates a blocking activity and a notification handler. The notification handler may include statements that mimic the external event on which the blocking activity blocks and/or any other statement required to maintain the consistency of the application program's state.

In block 404, the processing core may execute the blocking construct included in the blocking task. In block 406, the processing core may register the notification handler with the runtime system by storing the notification handler and/or information included in the body of the notification handler in an internal data structure. In block 408, the processing core may execute the blocking activity, such as by invoking a blocking system call to request information from an external resource. In block 410, the processing core may cause the blocking task to enter the blocked state and wait for a response to the blocking activity. For example, the processing core may wait for a response to the blocking system call issued in block 408.

In block 412, the processing core may receive in its runtime system an unblocking notification (e.g., a cancellation notification, etc.) from an external entity (e.g., a different thread, the application user, etc.) for the blocking thread. In block 414, the processing core may invoke the registered notification handler via the runtime system. In block 416, the processing core may cause the blocking task to exit the blocked state and perform cleanup operations.

In an embodiment, the blocking task launched in block 402 may include multiple blocking constructs, and each of the blocking constructs may encapsulate a blocking activity and one or more notification handlers associated with the blocking activity. In this embodiment, the processing core may execute one or more of the blocking constructs included in the blocking task in block 404, register the corresponding notification handlers with the runtime system in block 406, execute the corresponding blocking activities in block 408, cause the blocking task to enter the blocked state multiple times, and wait for a response for a currently executing blocking activity in block 410. As before, in block 412, the processing core may receive in its runtime system a notification (e.g., an unblocking notification, a cancellation notification, etc.) from an external entity for the blocking task. Consequently, the processing core may invoke registered notification handlers corresponding to only a currently executing blocking activity in block 414, and cause the blocked task to perform precise cleanup operations corresponding only to that specific blocking activity in block 416.

Figure 4B:
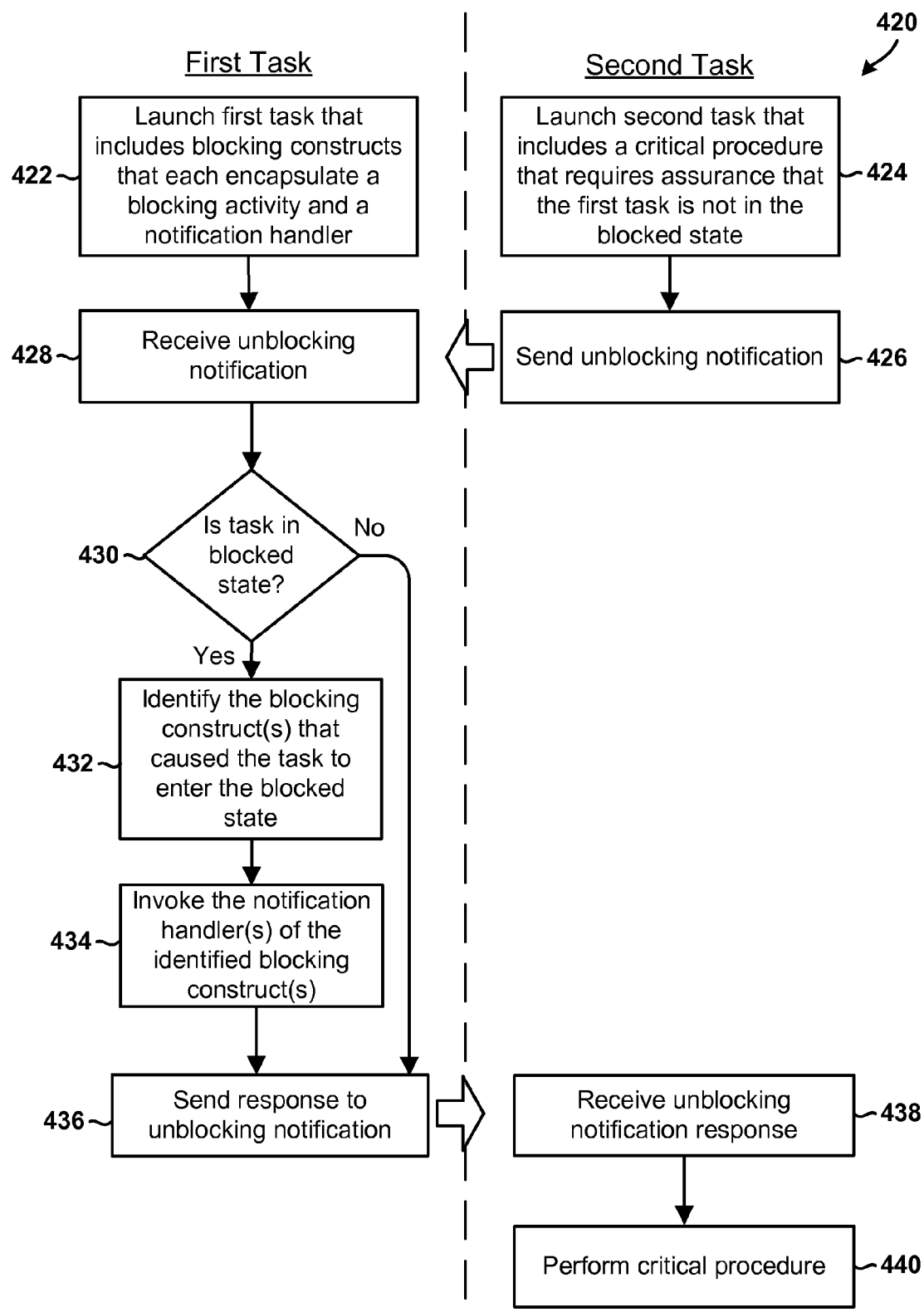
FIG. 4B is a process flow diagram illustrating a method of executing tasks in accordance with another embodiment.

FIG. 4B illustrates a method 420 of determining whether a notification handler should be invoked in accordance with an embodiment. Method 420 may be performed by one or more processors or processing cores in a computing device, system-on-chip, system-in-a-package, etc. In block 422, the processing core may launch a first task that includes blocking constructs. Each blocking construct may encapsulate a blocking activity and a notification handler. In an embodiment, as part of block 422, the processing core may define one or more blocking constructs that associate a specific blocking activity with a specific notification handler, and include such constructs in the body of the task and/or at the application program level before the task is launched.

In block 424, the same or different processing core may launch a second task that includes a critical procedure. The critical procedure may be a procedure that requires assurance that the first task is not in the blocked state before it is performed. In block 426, the processing core may send an unblocking notification from the second task to the first task (e.g., to the thread or processing core performing the first task, etc.). In block 428, the processing core associated with the first task (e.g., the processing core executing the thread performing the first task, etc.) may receive the unblocking notification. In determination block 430, the processing core may determine whether the task is in the blocked state. As shown below, the processing core may be configured to determine whether a notification handler should be invoked based on the determination made in determination block 430.

In response to determining that the task is in the blocked state (i.e., determination block 430="Yes"), the processing core may identify the blocking construct(s) that caused the task to enter the blocked state in block 432. In block 434, the processing core may invoke the notification handler(s) of the identified blocking construct(s). The inclusion and use of blocking constructs within the body of the task allows the computing device to execute the specific notification handler associated with the specific blocking activity (e.g., blocking call) for each task that is blocked. As such, in blocks 432 and 434, the computing device may determine whether to execute a notification handler based on whether it is associated with a specific blocking activity (e.g., a particular blocking call) for which a task is blocked. Alternatively or in addition, in an embodiment, the processing core may be configured to determine the type of blocking call made by a blocked task, identify the operations for unblock the task based on the determined type of blocking call, and perform only the identified operations (i.e., as opposed to executing a generic notification handler) in blocks 432 and 434.

After invoking the notification handler(s) in block 434 or in response to determining that the task is not the blocked state (i.e., determination block 430="No"), the processing core may send a response to the unblocking notification in block 436. In block 438, the processing core associated with the second task (e.g., the processing core executing the thread performing the second task, etc.) may receive the unblocking notification. In block 440, the processing core may perform the critical procedure.

Thus, unlike conventional solutions that would require the second task invoke a notification handler of the first task before the second task executes its critical procedure (i.e., regardless of whether the first task is currently in the blocked state), the various embodiments allow the computing device to determine whether a notification handler should be invoked (e.g., based on determination block 430), and to invoke only the notification handlers associated with the blocking activities (e.g., blocking call) that caused the task to enter the blocked state. This improves the functionality of the computing device by improving its performance, efficiency, and power consumption characteristics.

Figure 5:
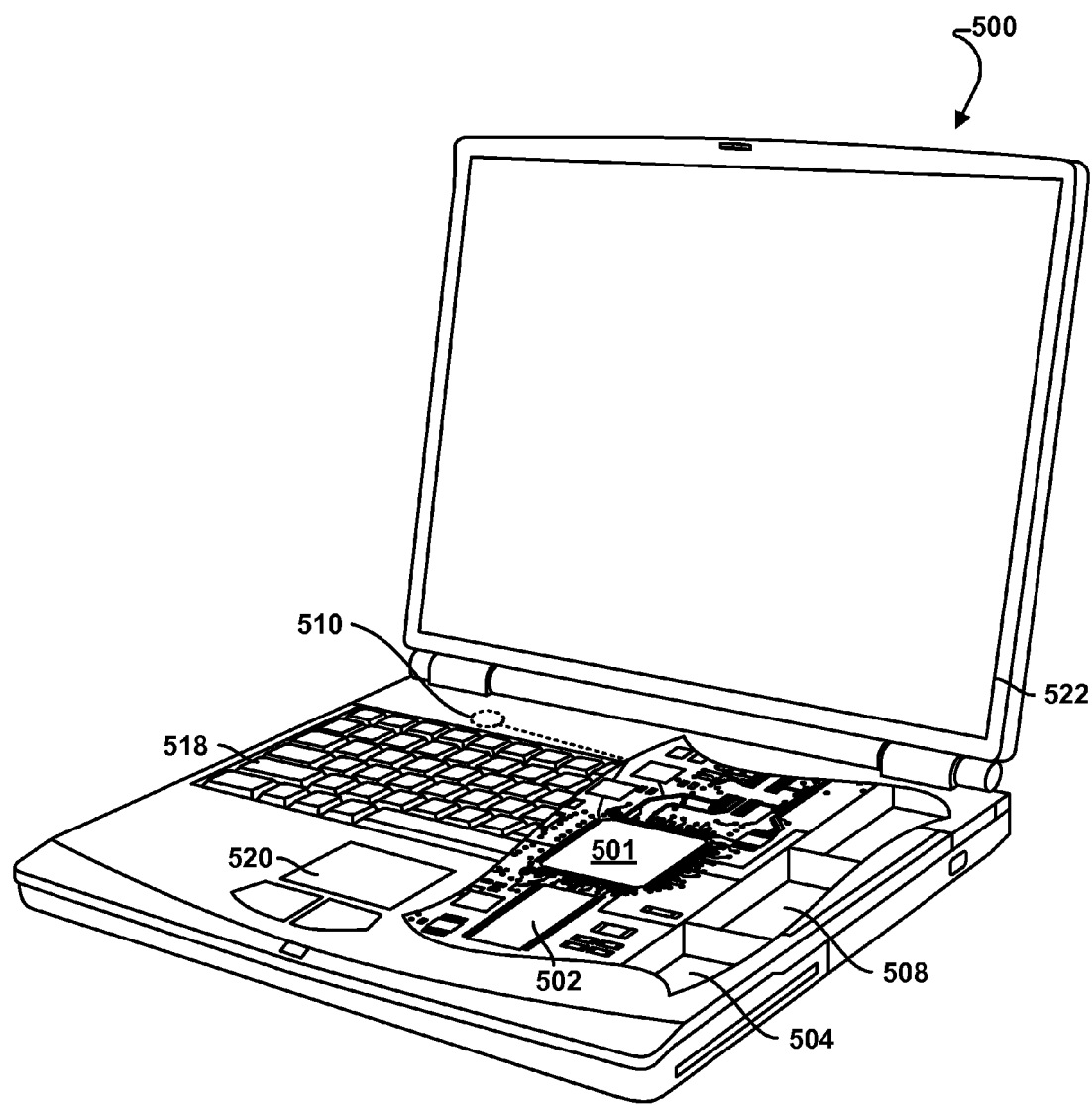
FIG. 5 is a block diagram of an example laptop computer suitable for use with the various embodiments.
Figure 6:
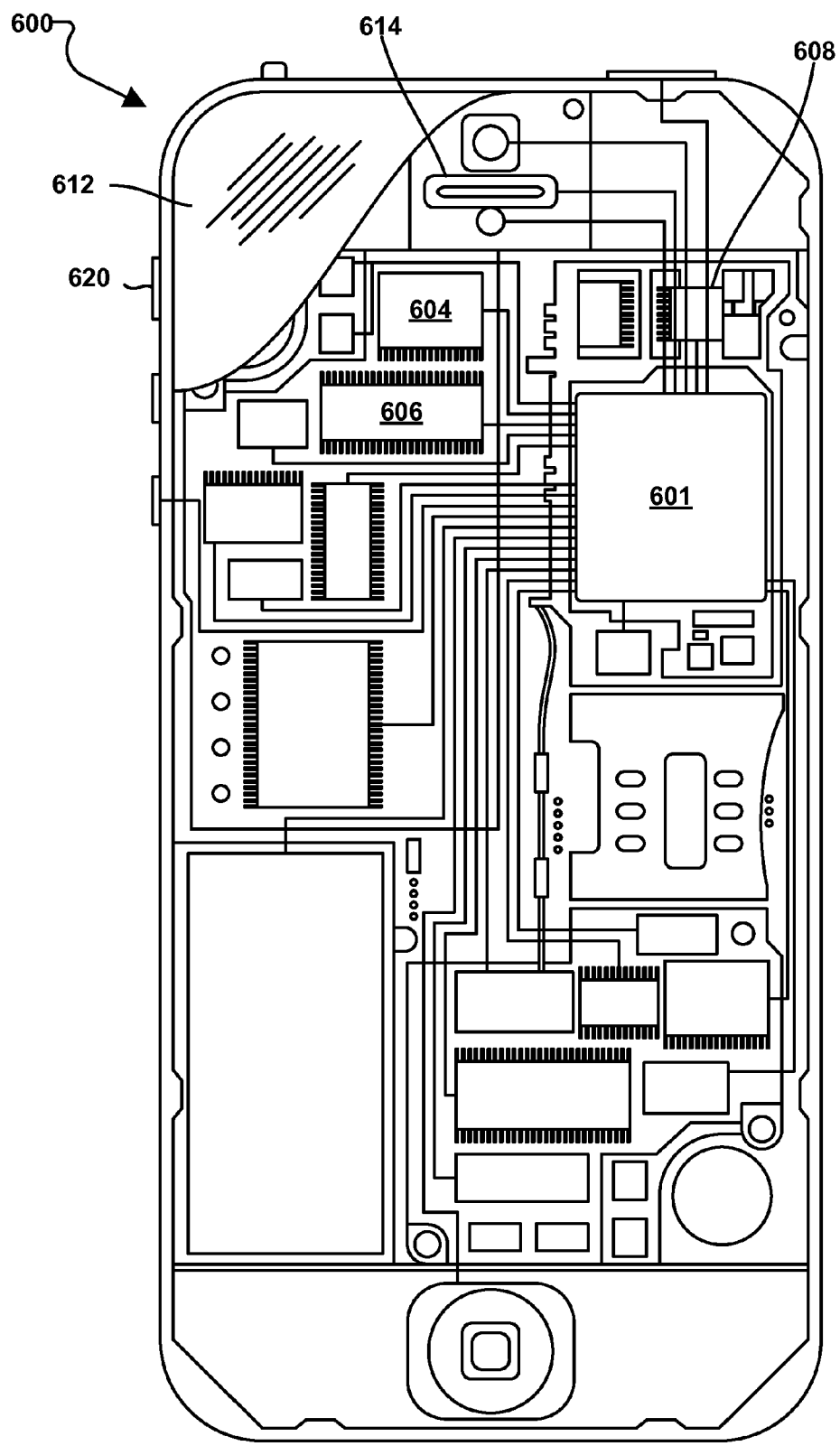
FIG. 6 is a block diagram of an example smartphone suitable for use with the various embodiments.
Figure 7:
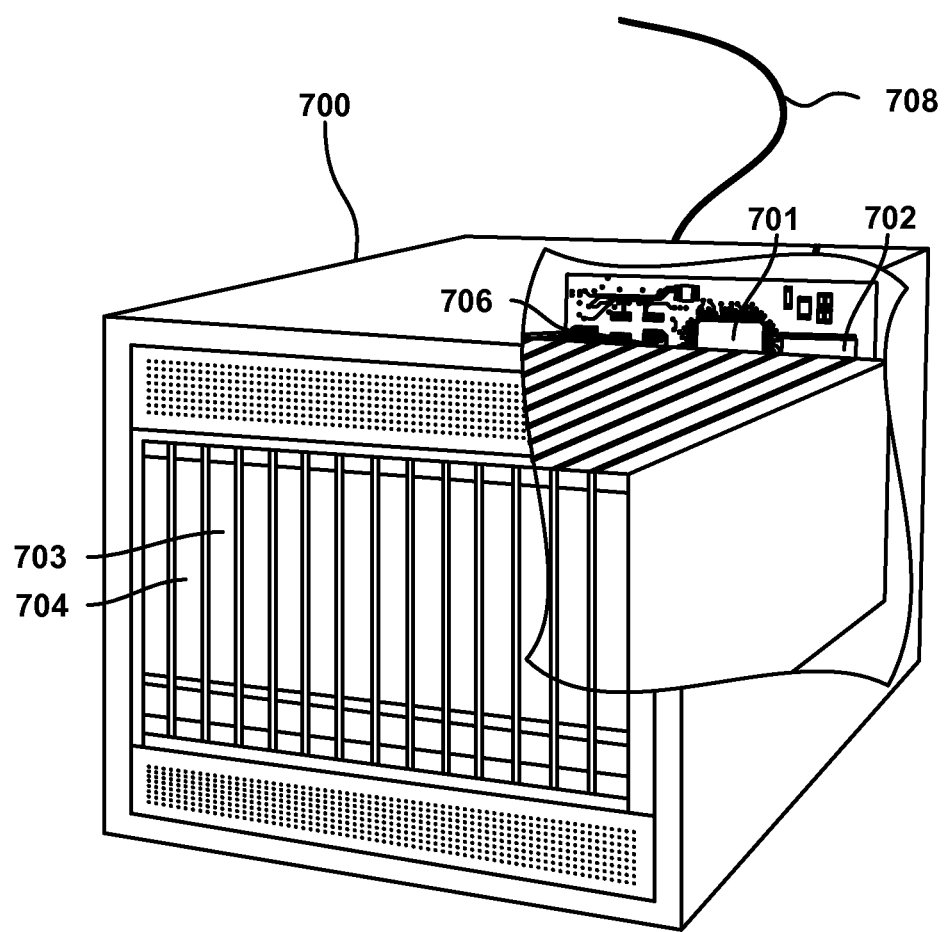
FIG. 7 is a block diagram of an example server computer suitable for use with the various embodiments.

The various embodiments (including but not limited to embodiments discussed above with respect to FIGS. 1, 3, 4A and 4B) may be implemented on a variety of computing devices, examples of which are illustrated in FIGS. 5-7.

Computing devices may have in common the components illustrated in FIG. 5, which illustrates an example personal laptop computer 500. Such a personal laptop computer 500 generally includes a multi-core processor 501 coupled to volatile memory 502 and a large capacity nonvolatile memory, such as a disk drive 504. The personal laptop computer 500 may also include a compact disc (CD) and/or DVD drive 508 coupled to the processor 501. The personal laptop computer 500 may also include a number of connector ports coupled to the processor 501 for establishing data connections or receiving external memory devices, such as a network connection circuit for coupling the processor 501 to a network. The personal laptop computer 500 may have a radio/antenna 510 for sending and receiving electromagnetic radiation that is connected to a wireless data link coupled to the processor 501. The personal laptop computer 500 may further include keyboard 518, a pointing a mouse pad 520, and a display 522 as is well known in the computer arts. The multi-core processor 501 may include circuits and structures similar to those described above and illustrated in FIG. 1.

FIG. 6 illustrates a smartphone 600 that includes a multi-core processor 601 coupled to internal memory 604, a display 612, and to a speaker 614. Additionally, the smartphone 600 may include an antenna for sending and receiving electromagnetic radiation that may be connected to a wireless data link and/or cellular telephone transceiver 608 coupled to the processor 601. The smartphone 600 may also include menu selection buttons or rocker switches 620 for receiving user inputs. The smartphone 600 may also include a sound encoding/decoding (CODEC) circuit 606, which digitizes sound received from a microphone into data packets suitable for wireless transmission and decodes received sound data packets to generate analog signals that are provided to the speaker to generate sound. Also, one or more of the processor 601, cellular telephone transceiver 608 and CODEC circuit 606 may include a digital signal processor (DSP) circuit (not shown separately).

The various embodiments may also be implemented on any of a variety of commercially available server devices, such as the server 700 illustrated in FIG. 7. Such a server 700 typically includes multiple processor systems one or more of which may be or include a multi-core processor 701. The processor 701 may be coupled to volatile memory 702 and a large capacity nonvolatile memory, such as a disk drive 703. The server 700 may also include a floppy disc drive, compact disc (CD) or DVD disc drive 704 coupled to the processor 701. The server 700 may also include network access ports 706 coupled to the processor 701 for establishing data connections with a network 708, such as a local area network coupled to other broadcast system computers and servers.

The processors 501, 601, 701 may be any programmable multi-core multiprocessor, microcomputer or multiple processor chips that can be configured by software instructions (applications) to perform a variety of functions, including the functions and operations of the various embodiments described herein. Multiple processors may be provided, such as one processor dedicated to wireless communication functions and one processor dedicated to running other applications. Typically, application programs may be stored in the memory 502, 604, 702 before they are accessed and loaded into the processor 501, 601, 701. In some mobile computing devices, additional memory chips (e.g., a Secure Data (SD) card) may be plugged into the mobile device and coupled to the processor 501, 601, 701. The memory 502, 604, 702 may be a volatile or nonvolatile memory, such as flash memory, or a mixture of both. For the purposes of this description, a general reference to memory refers to all memory accessible by the processor 501, 601, 701, including internal memory, removable memory plugged into the mobile device, and memory within the processor 501, 601, 701 itself.

Computer program code or "code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein refer to machine language code (such as object code) whose format is understandable by a processor.

Computing devices may include an operating system kernel that is organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components discussed in this application may be implemented in either the kernel space or the user space, unless expressly stated otherwise.

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core, and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of executing a blocking task in a computing device, comprising:
   executing, via a processor of the computing device, a thread that performs the blocking task, wherein the blocking task defines a plurality of blocking constructs;
   executing a blocking construct of the plurality of blocking constructs defined within a body of the blocking task, wherein the blocking construct encapsulates a specific blocking activity and an associated notification handler;
   registering the associated notification handler with a runtime system of the computing device;
   performing the specific blocking activity encapsulated by the executed blocking construct;
   causing the blocking task to enter a blocked state;
   receiving an unblocking notification from an external entity; and invoking the registered notification handler in response to receiving the unblocking notification from the external entity.

2. The method of claim 1, further comprising
determining whether the blocking task is in the blocked state, and
wherein invoking the registered notification handler in response to receiving the unblocking notification from the external entity comprises invoking the registered notification handler in response to determining that the blocking task is in the blocked state and receiving the unblocking notification from the external entity.

3. The method of claim 1, wherein receiving the unblocking notification from the external entity comprises receiving a cancellation notification from the external entity.

4. The method of claim 1, wherein registering the associated notification handler with the runtime system of the computing device comprises storing information included in the body of the associated notification handler in an internal data structure.

5. The method of claim 1, wherein invoking the registered notification handler in response to receiving the unblocking notification from the external entity comprises:
identifying the specific blocking activity that was performed; and
invoking only the associated notification handler that corresponds to the identified blocking activity.

6. A computing device for executing a blocking task, comprising:
a memory;
a processor coupled to the memory, wherein the processor is configured with processor-executable instructions to perform operations comprising:
executing a thread that performs the blocking task, wherein the blocking task defines a plurality of blocking constructs;
executing a blocking construct in the plurality of blocking constructs that is defined within a body of the blocking task, wherein the blocking construct encapsulates a specific blocking activity and an associated notification handler;
registering the associated notification handler with a runtime system;
performing the specific blocking activity encapsulated by the executed blocking construct;
causing the blocking task to enter a blocked state;
receiving an unblocking notification from an external entity; and
invoking the registered notification handler in response to receiving the unblocking notification from the external entity.

7. The computing device of claim 6, wherein:
the processor is configured with processor-executable instructions to perform operations further comprising determining whether the blocking task is in the blocked state; and
the processor is configured with processor-executable instructions to perform operations such that invoking the registered notification handler in response to receiving the unblocking notification from the external entity comprises invoking the registered notification handler in response to determining that the blocking task is in the blocked state and receiving the unblocking notification from the external entity.

8. The computing device of claim 6, wherein the processor is configured with processor-executable instructions to perform operations such that receiving the unblocking notification from the external entity comprises receiving a cancellation notification from the external entity.

9. The computing device of claim 6, wherein the processor is configured with processor-executable instructions to perform operations such that registering the associated notification handler with the runtime system comprises storing information included in the body of the associated notification handler in an internal data structure.

10. A non-transitory processor-readable storage medium having stored thereon processor-executable instructions configured cause a processor in a computing device to perform operations for executing a blocking task comprising:
executing a thread that performs the blocking task, wherein the blocking task defines a plurality of blocking constructs;
executing a blocking construct in the plurality of blocking constructs that is defined within a body of the blocking task, wherein the blocking construct encapsulates a specific blocking activity and an associated notification handler;
registering the associated notification handler with a runtime system;
performing the specific blocking activity encapsulated by the executed blocking construct;
causing the blocking task to enter a blocked state;
receiving an unblocking notification from an external entity; and
invoking the registered notification handler in response to receiving the unblocking notification from the external entity.

11. The non-transitory processor-readable storage medium of claim 10, wherein:
the stored processor-executable instructions are configured to cause the processor to perform operations further comprising determining whether the blocking task is in the blocked state; and
the stored processor-executable instructions are configured to cause the processor to perform operations such that invoking the registered notification handler in response to receiving the unblocking notification from the external entity comprises invoking the registered notification handler in response to determining that the blocking task is in the blocked state and receiving the unblocking notification from the external entity.

12. The non-transitory processor-readable storage medium of claim 10, wherein the stored processor-executable instructions are configured to cause the processor to perform operations such that receiving the unblocking notification from the external entity comprises receiving a cancellation notification from the external entity.

13. The non-transitory processor-readable storage medium of claim 10, wherein the stored processor-executable instructions are configured to cause the processor to perform operations such that registering the associated notification handler with the runtime system comprises storing information included in the body of the associated notification handler in an internal data structure.

14. The computing device of claim 6, wherein the processor is configured with processor-executable instructions to perform operations such that invoking the registered notification handler in response to receiving the unblocking notification from the external entity comprises:
identifying the specific blocking activity that was performed; and
invoking only the associated notification handler that corresponds to the identified specific blocking activity.

15. The non-transitory processor-readable storage medium of claim 10, wherein the stored processor-executable instructions are configured to cause the processor to perform operations such that invoking the registered notification handler in response to receiving the unblocking notification from the external entity comprises:
  identifying the specific blocking activity that was performed; and
  invoking only the associated notification handler that corresponds to the identified specific blocking activity.

* * * * *